United States Patent
Lin et al.

(10) Patent No.: US 12,001,384 B2
(45) Date of Patent: Jun. 4, 2024

(54) PROCESSING ELEMENT ARRAY AND OPERATING METHOD THEREOF

(71) Applicants: Inventec (Pudong) Technology Corporation, Shanghai (CN); INVENTEC CORPORATION, Taipei (TW)

(72) Inventors: Yu-Sheng Lin, Taipei (TW); Trista Pei-Chun Chen, Taipei (TW); Wei-Chao Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 17/988,833

(22) Filed: Nov. 17, 2022

(65) Prior Publication Data
US 2024/0086358 A1 Mar. 14, 2024

(30) Foreign Application Priority Data
Sep. 13, 2022 (CN) .......................... 202211111761.5

(51) Int. Cl.
G06F 12/128 (2016.01)
G06F 9/38 (2018.01)
G06F 9/54 (2006.01)
G06F 15/80 (2006.01)

(52) U.S. Cl.
CPC ............... *G06F 15/80* (2013.01); *G06F 9/54* (2013.01)

(58) Field of Classification Search
None
See application file for complete search history.

(56) References Cited

U.S. PATENT DOCUMENTS

| 10,062,115 | B2 * | 8/2018 | Taylor | G06Q 40/04 |
| 11,550,586 | B2 * | 1/2023 | Shahim | G06N 3/045 |
| 11,792,226 | B2 * | 10/2023 | Vaishnavi | G06F 16/00 726/3 |

* cited by examiner

Primary Examiner — Hyun Nam
(74) Attorney, Agent, or Firm — Locke Lord LLP; Tim Tingkang Xia, Esq.

(57) ABSTRACT

A processing element array includes N processing elements (PE) arranged linearly, N≥2, and an operating method of the PE array includes: performing a first data transmission procedure, where an initial value of I is 1 and the first data transmission procedure includes: operating, by an $i^{th}$ PE, according to a first datum stored in itself, and sending the first datum to other PEs for their operations, adding 1 to I when I<N, and performing the first data transmission procedure again, performing a second data transmission procedure when I is equal to N, which includes: operating, by the $J^{th}$ PE, according to a second datum stored in itself, and sending the second datum to other PEs for their operations, reducing J by 1 when J>1 and the $(J-1)^{th}$ PE has the second datum, and performing the second data transmission procedure again.

9 Claims, 12 Drawing Sheets

PROCESSING ELEMENT ARRAY AND OPERATING METHOD THEREOF

CROSS-REFERENCE TO RELATED APPLICATIONS

This non-provisional application claims priority under 35 U.S.C. § 119(a) on Patent Application No(s). 202211111761.5 filed in China on Sep. 13, 2022, the entire contents of which are hereby incorporated by reference.

BACKGROUND

1. Technical Field

The present disclosure relates to data movement optimization and scientific computation, and more particularly to a processing element array and operating method thereof.

2. Related Art

In data-intensive scientific computations, fetching data from memory consumes more power and causes more latency, compared with applying arithmetic operations on the data. To minimize the data fetch, it could be essential to design an efficient data exchanging mechanism between processing elements (PEs), such that one data fetch be reused for multiple arithmetic operations. For this purpose, it is essential to allocate data space for each timing and PE, and design datapath between PEs to deliver data on-time.

One classic method is to connect the PEs in a linear topology. The linear datapath can deliver one data per timestep. However, if the PEs have to obtain multiple data to complete a computation, since the PEs do not utilize local storage, they have to deliver the data to neighbors immediately at every timing, otherwise the computation is blocked. However, this method has to complete the computation in multiple passes, and each pass occupies the same amount of bandwidth.

By utilizing local storage, every PE can access the needed data without interfering with the other PEs and operate at full speed. However, this requires to store duplicate data in multiple storage devices locally, causing severe storage overhead.

SUMMARY

Accordingly, the present disclosure proposes a processing element array and operating method thereof.

According to an embodiment of the present disclosure, an operation method of a processing element (PE) array is proposed, where the PE array includes a plurality of PEs arranged linearly, a number of the plurality of PEs is N, N is greater than or equal to 2, and the operation method of the PE array includes: performing, by the plurality of PEs, a first data transmission procedure, wherein an initial value of I is 1, and the first data transmission procedure comprises: calculating, by an $I^{th}$ PE of the plurality of PEs, according to a first datum stored in itself; sending, by the $I^{th}$ PE, the first datum to the plurality of PEs except the $I^{th}$ PE; calculating, by the plurality of PEs except the $I^{th}$ PE, according to the first datum; when I is less than N, adding 1 to I and performing the first data transmission procedure again by the plurality of PEs; when I is equal to N, performing a second data transmission procedure by the plurality of PEs, wherein an initial value of J is N, and the second data transmission procedure comprises: calculating, by an $J^{th}$ PE of the plurality of PEs, according to a second datum stored in itself; sending, by the $J^{th}$ PE, the second datum to the plurality of PEs except the $J^{th}$ PE; calculating, by the plurality of PEs except the $J^{th}$ PE, according to the second datum; and when J is greater than 1 and the $(J-1)^{th}$ PE stores the second datum, subtracting 1 from J and performing the second data transmission procedure again by the plurality of PEs.

According to an embodiment of the present disclosure, a processing element (PE) array includes a plurality of PEs arranged linearly and (N−1) transmission circuits. The number of the plurality of PEs is N and N is greater than or equal to 2. Each of the plurality of PEs includes a processor and a memory such that the plurality of PEs comprises N processors and N memories. The N memories are configured to store P data, and P is greater than N. The first memory to a $N^{th}$ memory of the N memories are respectively configured to store a first datum to a $N^{th}$ datum of the P data. The $N^{th}$ memory of the N memories is further configured to store a $(N+1)^{th}$ datum of the P data. Each of the N processors calculates according to one of the P data stored in one of the N memories corresponding to itself, or calculates according to another one of the P data received from other PE. Each of the (N−1) transmission circuits is electrically connected to a left PE and a right PE adjacent to each other in the N PEs. Each of the (N−1) transmission circuits is configured to receive information from the left PE and sends the information to the right PE, or receive another information from the right PE and sends said another information to the left PE.

According to an embodiment of the present disclosure, a processing element (PE) array includes M×N PEs, (M×N−M) row transmission circuits, and (M×N−N) column transmission circuits. The M×N PEs are arranged in M rows and N columns. Both M and N are greater than or equal to 2. Each of the M×N PEs includes a processor, a row memory, and a column memory such that the M×N PEs comprise M×N processors. Each of the M rows has N row memories, and each of the N columns has M column memories. The N row memories located in the same row are configured to store P data and P is greater than N. The first row memory to a $N^{th}$ row memory in the N row memories located in the same row are respectively configured to store a first datum to the $N^{th}$ datum in the P data. The $N^{th}$ row memory in the N row memories located in the same row is configured to store a $(N+1)^{th}$ datum in the P data. Each of N processors in the same row calculates according to a datum stored in the row memory corresponding to itself, or calculates according to another datum received from other PEs. The M column memories located in the same column are configured to store Q data and Q is greater than M. The first column memory to a $M^{th}$ column memory in the M column memories located in the same column are respectively configured to store a first datum to the $M^{th}$ datum in the Q data. The $M^{th}$ column memory in the N column memories located in the same column is configured to store a $(M+1)^{th}$ datum in the Q data. Each of M processors in the same column calculates according to a datum stored in the column memory corresponding to itself, or calculates according to another datum received from other PEs. Each of the (M×N−M) row transmission circuits is electrically connected to a left PE and a right PE adjacent to each other in the N PEs in each of the M rows. Each of the (M×N−M) row transmission circuits is configured to receive a row data from the left PE and send the row data to the right PE, or receive another row data from the right PE and send said another row data to the left PE. Each of the (M×N−N) column transmission circuits is electrically connected to an upper PE and a lower PE adjacent to each other in the M PEs in each of the N columns. Each of the (M×N−N) column transmission circuits is configured to receive a column data from the upper PE and send the column data to the lower PE, or receive another column data from the lower PE and send said another column data to the upper PE.

In view of the above, the processing element array and its operating method proposed by the present disclosure allocate shared, non-duplicated data chunks across multiple memories inside different PEs. Since data chunks are scattered across the PEs, during different computation phases, only one PE holds the data and is eligible to deliver the data to the other PEs. Therefore, the direction of data delivery changes over the time. The method proposed by the present disclosure may reduce the number of changes in the direction of data transmission. The present disclosure applies to at least the convolutional neural network operations and the matrix multiplication operations, and both scientific computations are considered as the most important workloads in modern deep learning.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
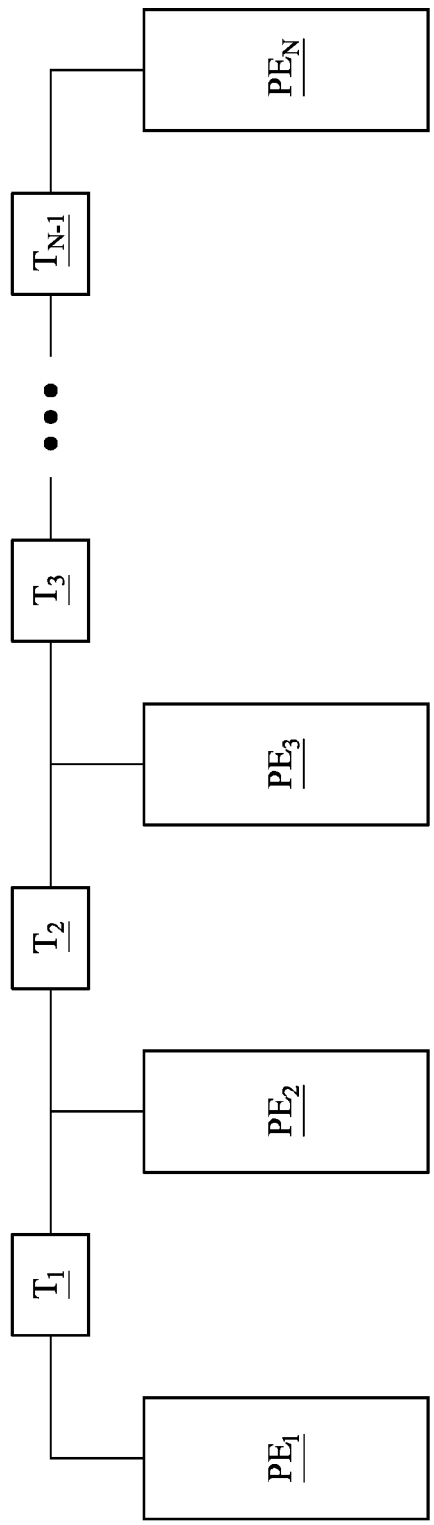
FIG. 1 is an architecture diagram of the processing element array according to a first embodiment of the present disclosure.
Figure 2:
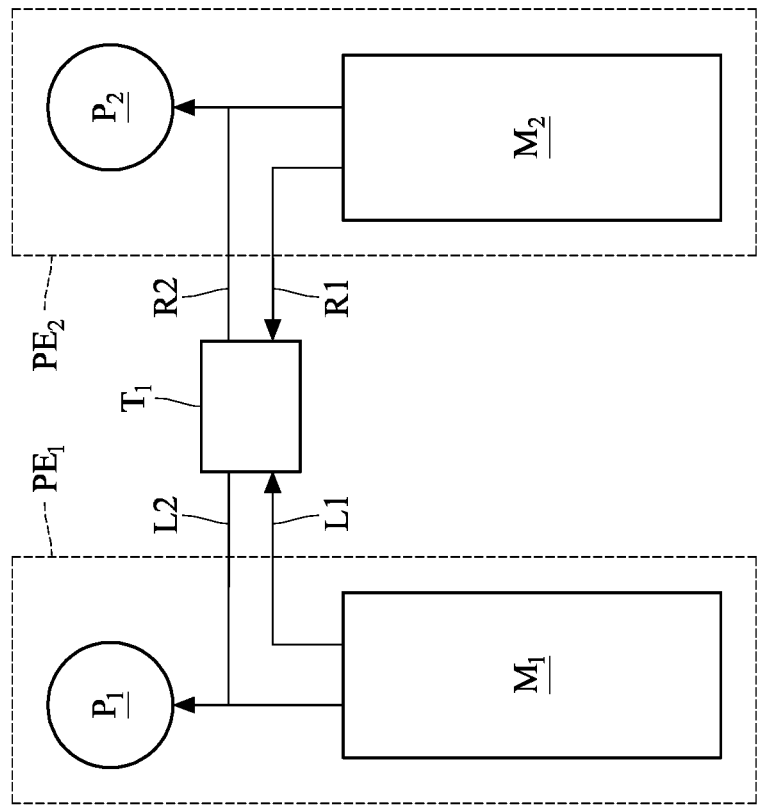
FIG. 2 is a schematic diagram of a transmission circuit connecting two processing elements.

FIG. 1 is an architecture diagram of a processing element (PE) array according to an embodiment of the present disclosure. As shown in FIG. 1, the PE array includes N PEs, $PE_1$, $PE_2$, $PE_3$, ..., and $PE_N$, arranged linearly, and (N−1) transmission circuits, $T_1$, $T_2$, $T_3$, ..., and $T_{N-1}$, where N is greater than or equal to 2. FIG. 2 is a schematic diagram of a transmission circuit connecting two processing elements, and takes the transmission circuit $T_1$, the processing elements $PE_1$ and $PE_2$ as an example.

Each PE has identical structure, including a processor and a memory, so the N PEs include N processors and N memories. Each transmission circuit is electrically connected to a left PE and a right PE adjacent to each other in the N PEs. In other words, each transmission circuit is electrically connected to two adjacent PEs. Each transmission circuit is configured to receive a datum from the left PE and send this datum to the right PE, or receive another datum rom the right PE and send said another datum to the left PE.

As shown in FIG. 2, the direction of the arrow represents the direction of dataflow. Therefore, the processor $P_1$ may obtain the datum from the memory $M_1$, the processor $P_1$ may also obtain the datum in the memory $M_2$ of the right processing element $PE_2$ through the right input line R1, the transmission circuit $T_1$, and the left output line L2. The processor $P_2$ may also obtain the datum in the memory $M_1$ of the left processing element $PE_1$ through the left input line L1, the transmission circuit $T_1$, and the right output line R2.

The memory is electrically connected to the processor and the transmission circuit. As shown in FIG. 2, the left processing element $PE_1$ connected to the transmission circuit $T_1$ includes a processor $P_1$ and a memory $M_1$, and the right processing element $PE_2$ connected to the transmission circuit $T_1$ includes a processor $P_2$ and a memory $M_2$. It should be noted that the left and right PEs are named according to their position relative to the transmission circuit. Assuming that FIG. 2 uses the PEs $PE_2$ and $PE_3$ of FIG. 1 as an example, the left PE is $PE_2$ and the right PE is $PE_3$.

Figure 3:
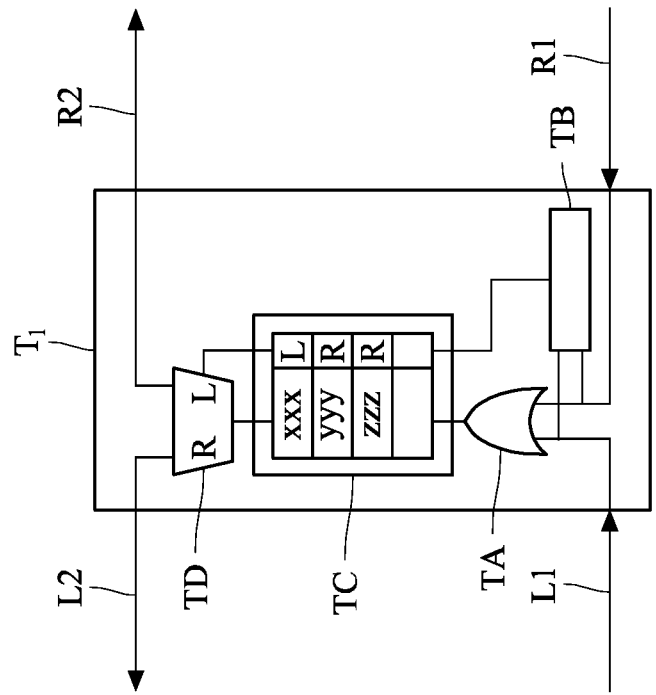
FIG. 3 is an internal architecture diagram of an embodiment of the transmission circuit.

FIG. 3 is an internal architecture diagram of an embodiment of the transmission circuit and takes the transmission circuit $T_1$ as an example. Each transmission circuit has identical structure. The transmission circuit $T_1$ is connected to the left processing element $PE_1$ through the left input line L1 and the left output line L2. The transmission circuit $T_1$ is connected to the right processing element $PE_2$ through the right input line R1 and the right output line R2. The transmission circuit $T_1$ includes a collector TA, a detector TB, a queue TC, and an output selector TD.

The collector TA is electrically connected to the left input line L1, the right input line R1, and a data field of the queue TC. In an example, the collector TA is a logical-OR circuit. The collector TA is configured to store the datum (the "xxx" shown in FIG. 2) of the left input line into the queue TC, or store the datum (the "yyy" and "zzz" shown in FIG. 2) of the right input line into the queue TC. It should be noted that both the left input line L1 and the right input line R1 will not have datum at the same time.

The detector TB is electrically connected to the left input line L1 and the right input line R1 and a source label field of the queue TC. The detector TB senses the electrical signals (e.g. voltage) on the left input line L1 and the right input line R1, thereby determining the source of the datum received by the collector TA. As the example shown in FIG. 2, the source of the datum "xxx" is left PE, the source of the data "yyy" and "zzz" is the right PE. The detector TB further records the label of the datum source into the source label field of the queue TC. As shown in FIG. 2, the detector TB generates a left label when the left input line L1 has the datum and generates the right label when the right input line R1 has the datum.

The queue TC is electrically connected to the collector TA and the detector TB. The queue TC includes a plurality of data rows, and each data row includes a data field and a source label field. The data field is configured to store the datum of one of the left input line L1 and the right input line R1. The source label field is configured to store one of the left label and the right label. The bit width of the data field depends on the size of the datum itself. The source label field is one-bit wide because indicating whether the data source is a left PE or a right PE only needs one bit. The operation of the queue TC adopts the first-in-first-out (FIFO) policy. For example, if the input time of the datum "xxx" is earlier than the input time of the datum "yyy", the output time of the datum "xxx" will be earlier than the output time of the datum "yyy". The present disclosure does not limit the hardware implementation of the queue TC, as long as it is a storage medium that can implement the data structure (including the data field and the source label field) as shown in FIG. 2, it should be regarded as an example of the queue TC.

The output selector TD is electrically connected to the left input line L2, the right output line R2, and the queue TC. The output selector TD reads a data row at a time to output the datum. In an example, the output selector TD is a multiplexor. According to the content of the source label field, the output selector TD outputs the datum of the same row to one of the left output line L2 and right output line T2. For example, the datum "xxx" is sent to the right PE through the right output line R2, and the datum "yyy" is sent to the left PE through the left output line L2.

When the transmission circuit $T_1$ switches the transmission direction, for example, from the left transmission (the right PE sends the datum to the left PE) to the right transmission (the left PE sends the datum to the right PE), the data in the queue TC needs to be flushed. This operation of switching the transmission direction is called turnaround, and the time it takes is called the turnaround time. Therefore, if the operation of the PE array has to switch the transmission direction frequently, the increased turnaround time may reduce the overall performance. To minimize the turnaround time, the PE array of the first embodiment of the present disclosure adopts a special allocation policy when storing multiple data, thereby decreasing the number of switch transmission directions. Please refer to FIG. 4.

Figure 4:
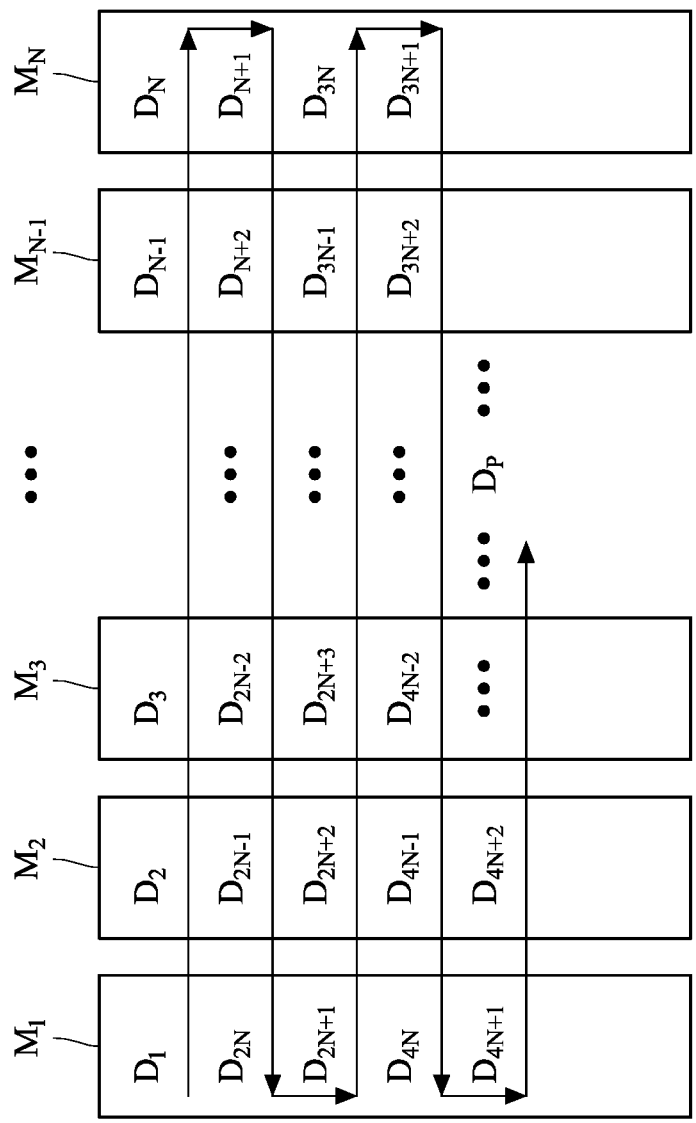
FIG. 4 is a schematic diagram of an allocation policy proposed by the present disclosure.

FIG. 4 is a schematic diagram of an allocation policy proposed by the present disclosure. For the sake of brevity, FIG. 4 only shows N memories $M_1$, $M_2$, $M_3$, ..., $M_{N-1}$ and $M_N$ in the PE array. The N memories are configured to store P data $D_1$, $D_2$, $D_3$, ..., and $D_P$, where P is greater than N.

As shown in FIG. 4, the first datum $D_1$ to the $N^{th}$ datum $D_N$ are stored in the first memory $M_1$ to the $N^{th}$ memory $M_N$ one by one, and the $(N+1)^{th}$ datum $D_{N+1}$ to the $2N^{th}$ datum $D_{2N}$ are stored in the $N^{th}$ memory $M_N$ to the first memory $M_1$ one by one, and so on. Overall, the allocation policy proposed in the present disclosure adopts a zigzag storage sequence until N data are distributed to all the memories for storage.

After all data are stored, the processor in each PE performs operations according to the data stored in the memory, or performs operations according to another datum received from other PEs. In addition, each PE sends the data stored in the memory to another adjacent PE through the transmission circuit, or receives another datum from the adjacent another PE through the transmission circuit. For details of each of the above operations, please refer to FIG. 5.

Figure 5:
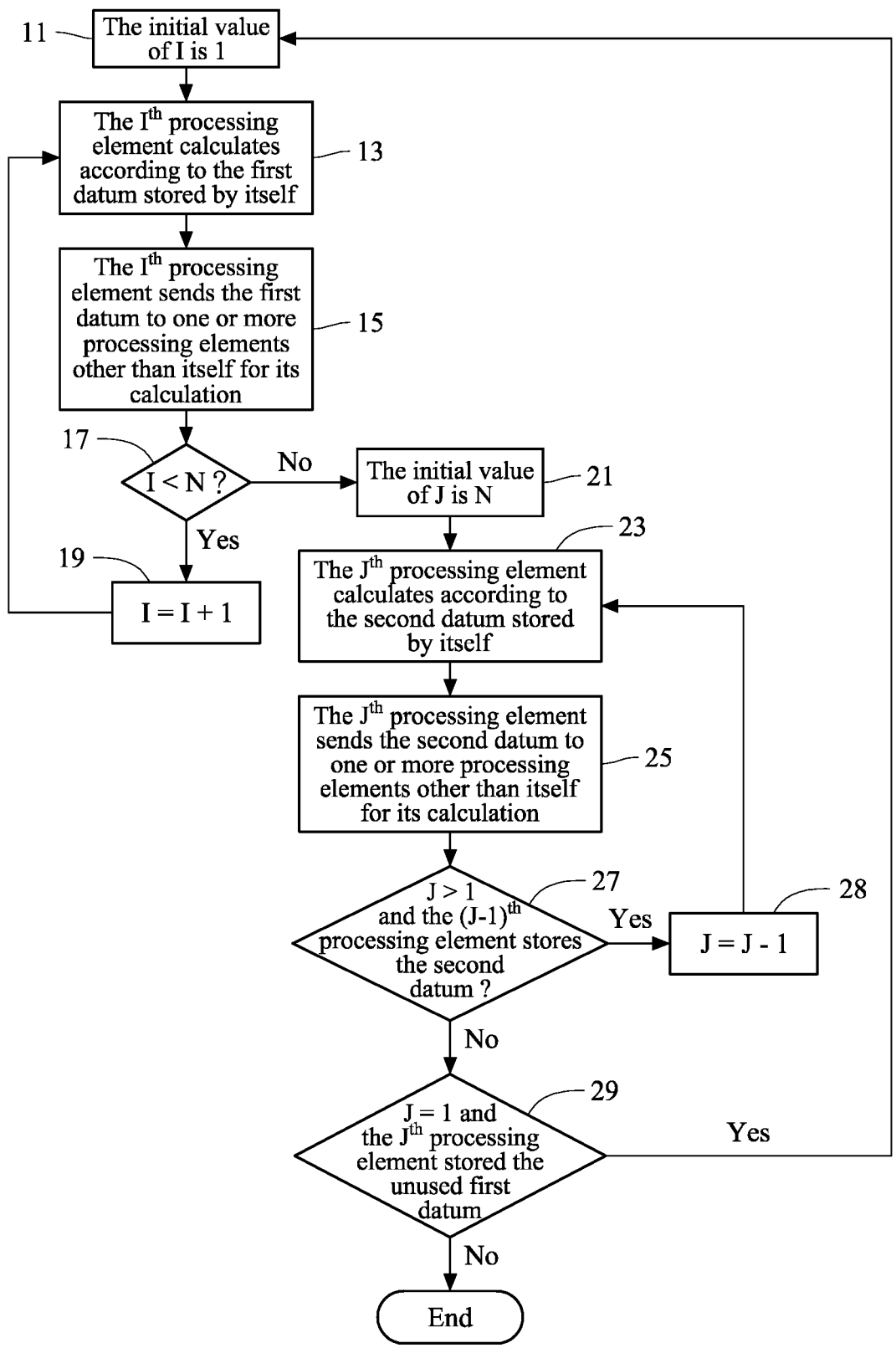
FIG. 5 is a flowchart of the operating method of the processing element array according to the first embodiment of the present disclosure.

FIG. 5 is a flowchart of the operating method of the processing element array according to the first embodiment of the present disclosure. The method includes steps 11 to 29. The method mainly uses N PEs to perform a first data transmission procedure and a second data transmission procedure, where the first data transmission procedure includes steps 13 and 15, and the second data transmission procedure includes steps 23 and 25.

In steps 11 and 13, the $I^{th}$ PE calculates according to the first datum stored by itself, where an initial value of I is one.

In step 15, the $I^{th}$ PE sends the first datum to one or more PEs other than itself for its/their calculation. In an embodiment, step 15 is equivalent to performing a broadcast procedure by the $I^{th}$ PE, with initial values of E and F are zero. The broadcast procedure includes following steps: the $(I+E)^{th}$ PE of the plurality of PEs sends the first datum to the $(I+E+1)^{th}$ PE; the $(I-F)^{th}$ PE of the plurality of PEs sends the first datum to the $(I-F-1)^{th}$ PE; adding 1 to E when (I+E) is less than N; subtracting 1 from F when (I−F) is greater than 1, and performing the broadcast procedure again.

In step S17, it is determined whether the current value of I is less than N. If I is less than N, perform step 19, add 1 to I, and return to step S13 to perform the first data transmission procedure again. If I is not less than N, perform step S21 to start the second data transmission procedure.

In an example, the implementation of steps 17 and 19 can be implemented through commands sent by a controller located outside the PE array, or rules pre-stored in each PE, and this is not limited in the present disclosure. The steps of any variable operation mentioned later may adopt the above-mentioned implementation manner.

In steps 21 and 23, the $J^{th}$ PE calculates according to the second datum stored by itself, where an initial value of J is N.

In step 25, the $J^{th}$ PE sends the second datum to one or more PE other than itself for its/their calculation. In an embodiment, step 25 is equivalent to performing the broadcast procedure by the $J^{th}$ PE, and the detail may refer to step 15.

In step S27, it is determined whether J is greater than 1 and whether the $(J-1)^{th}$ PE stores the second datum. If J is greater than 1 and the $(J-1)^{th}$ PE does store the second datum, perform step 28, subtract 1 from J, and return to step S23 to perform the second data transmission procedure again. If the determination of step 27 is "no", perform step 29 to determine whether J is equal to 1 and whether the $J^{th}$ PE stores an unused first datum. If J is equal to 1 and the $J^{th}$ PE does store the unused first datum, return to step 11 to set I to the initial value 1, and start the first data transmission procedure of the next round.

Regarding the first datum and the second datum, specifically, before performing the first data transmission procedure, the proposed method further includes steps for storing data according to the allocation policy by the N PEs. Specifically, the N PEs store a first portion of a set of data in a first order, and one or more of these PEs store a second portion of the set of data in a second order, where the first order is incremented from 1 to N, the second order is opposite to the first order. The first portion includes the first datum of each of the N PEs, and the second portion includes the second datum of each of the one or more PEs.

Please review the example of FIG. 4. For example, the first datum is any one of data $D_1$ to data D N in FIG. 4, or any one of data $D_{2N+1}$ to data $D_{3N}$, or any one of data $D_{4N+1}$ to data $D_P$. The second datum is any one of data $D_{N+1}$ to data $D_{2N}$ in FIG. 4, or any one of data $D_{3N+1}$ to data $D_{4N}$.

Figure 6:
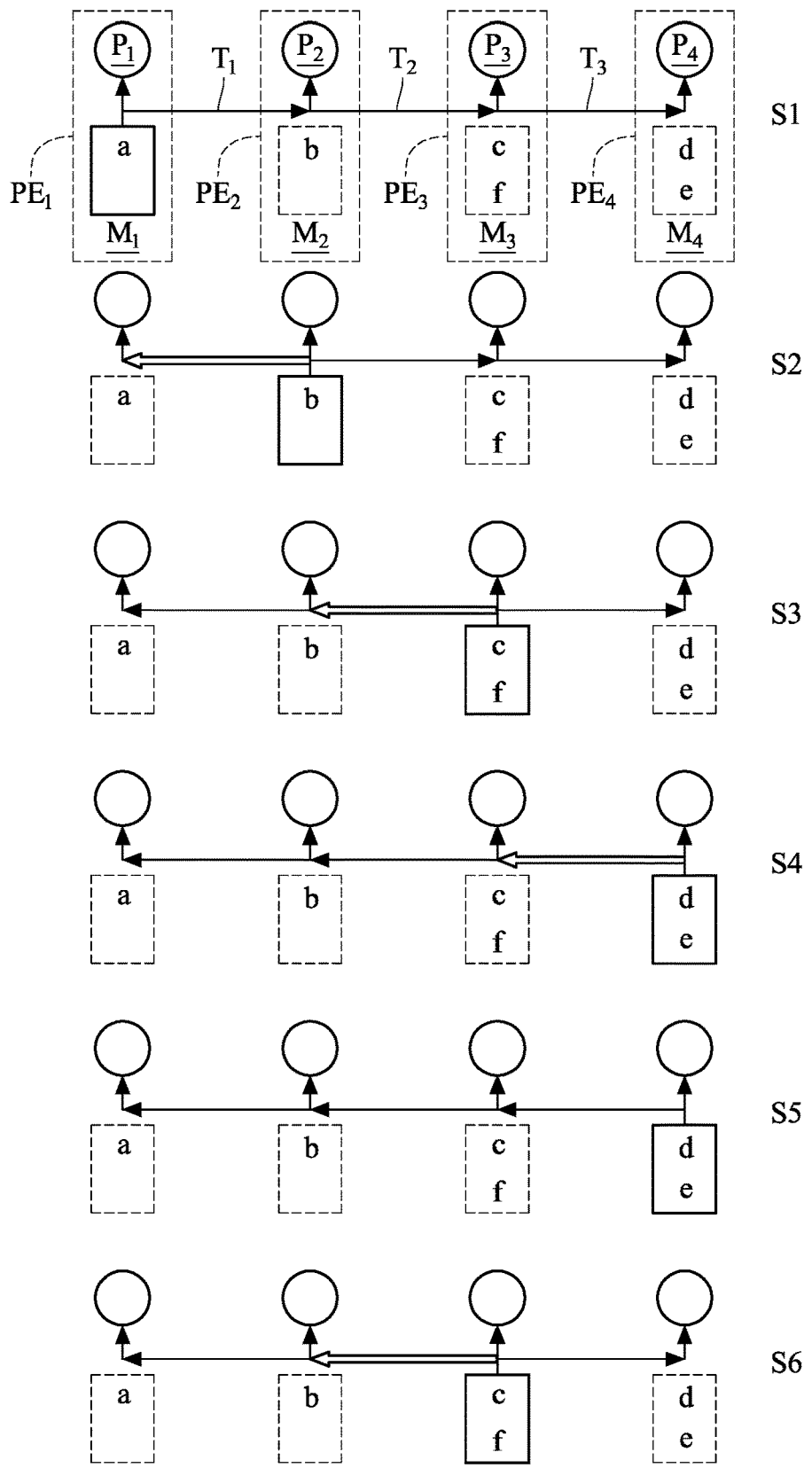
FIG. 6 is an example of the operating method of the processing element array according to the first embodiment of the present disclosure.

In order to easily understand the method described in FIG. 5, please refer to FIG. 6, which is an example of performing the method described in FIG. 5, where the number of PEs is 4 (N=4). The example shown in FIG. 6 includes six stages, S1 to S6. For the sake of brevity, the component symbols only appear in stage S1, where $PE_1$ to $PE_4$ represent the first PE to the fourth PE, respectively, $P_1$ to $P_4$ are the processors in the four PEs, $M_1$ to $M_4$ are the memories in the four PEs, $T_1$ to $T_3$ are the transmission circuits between the four PEs, and the component symbols are omitted in stages S2 to S6. In addition, "a" to "f" represent the first data to the sixth data that have been stored.

Stage S1 corresponds to steps 11 to 19. Each of stages S2, S3, S4 corresponds to steps 13 to 19. Stage S5 corresponds to steps 21 to 28. Stage S6 corresponds to step 21 to 27, and 29, and then the method ends.

In stage S1, the first processing element $PE_1$ broadcasts the first datum to the processors $P_2$, $P_3$, and $P_4$ (step S15). This broadcast operation includes: the $PE_1$ sends the first datum "a" the $PE_2$ through the transmission circuit $T_1$, the $PE_2$ sends the first datum "a" the $PE_3$ through the transmission circuit $T_2$, the $PE_3$ sends the first datum "a" the $PE_4$ through the transmission circuit $T_3$. After receiving the first data "a", processors $P_2$ to $P_4$ perform their calculations respectively (step S15). When 1=1, I<N is true (step 17). After the value of I is changed to 2 (step 19), the process goes to stage S2.

In stage S2, $PE_2$ calculates according to the first datum "b" (step 13), and then broadcasts the first datum "b" to $PE_1$, $PE_3$, and $PE_4$ (step 15). When 1=2, I<N is true (step 17). After the value of I is changed to 3 (step 19), the process goes to stage S3.

In stage S3, $PE_3$ calculates according to the first datum "c" (step 13), and then broadcasts the first datum "c" to $PE_1$, $PE_2$, and $PE_4$ (step 15). When 1=3, I<N is true (step 17). After the value of I is changed to 4 (step 19), the process goes to stage S4.

In stage S4, $PE_4$ calculates according to the first datum "d" (step 13), and then broadcasts the first datum "d" to $PE_1$, $PE_2$, and $PE_3$ (step 15). When 1=4, I<N is false (step 17), and the process goes to stage S5.

In stage S5, $PE_4$ obtains the second datum "e" and calculates by the processor $P_4$ (steps S21 and 23). So far, $PE_4$ has obtained the data including "a", "b", "c", "d", and "e". PE 4 broadcasts the second datum "e" to $PE_1$, $PE_2$, and $PE_3$ (step 25) for their calculating. When J=4, J>1 is true, and it is also true that the $(J-1)^{th}$ processing element $PE_3$ stores the second datum "f" (step 27). After the value of J is changed to 3 (step 28), the process goes to stage S6.

In stage S6, $PE_3$ calculates according to the second datum "f" (step 23), and then broadcasts the second datum "f" to $PE_1$, $PE_2$, and $PE_4$ (step 25). When J=3, J>1 is true, but it is false that the $(J-1)^{th}$ PE stores the second datum, so go to step 29. When J=3, J=1 is false, and it is also false that $J^{th}$ processing element $PE_3$ stores an unused first datum (step 29), so ends. It should be noted that the first data that have been used (such as "a" to "d") may not be reused.

Figure 7:
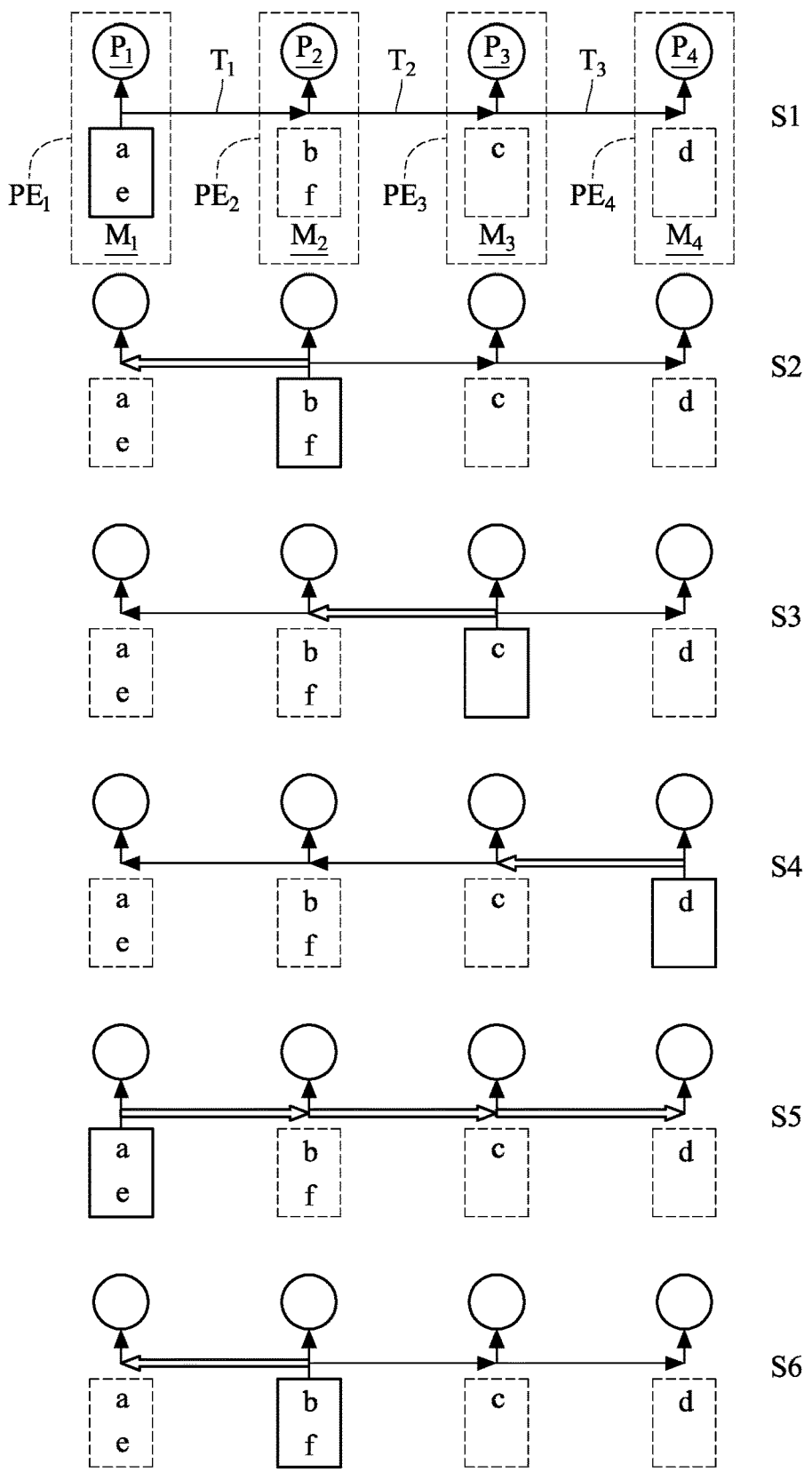
FIG. 7 is an example of another allocation policy.

In the example shown in FIG. 6, it should be noticed that the turnaround operation only happens at the transmission circuit $T_1$ in stage S2, the transmission circuit $T_2$ in stage S3, the transmission circuit $T_3$ in stage S4, and the transmission circuit $T_2$ in stage S6. This is because this example adopts the PE array and its operating method proposed in the first embodiment of the present disclosure. In contrast, FIG. 7 shows an example of adopting a traditional allocation policy, where the datum "e" is stored in $PE_1$, and the datum "f" is stored in $PE_2$. In this way, there are additional three turnaround operations performed by transmission circuits $T_1$ to $T_3$ in stage S5 as shown in FIG. 7. When the length of the PE array is longer, the additional turnaround operations are increased, thereby dragging down the overall performance.

On the other hand, by using the PE array, the operating method and the data allocation policy proposed by the first embodiment of the present disclosure, unnecessary turnaround operations may be reduced, thereby improving the operation performance of the PE array.

In the first embodiment, the dimension of the proposed PE array and its operating method is 1. In the second embodiment of the present disclosure, the memory, the transmission circuit and the lines connecting them can be added according to the first embodiment, thereby increasing the dimension to 2. Embodiments with higher dimensions can extend themselves in the same way.

Figure 8:
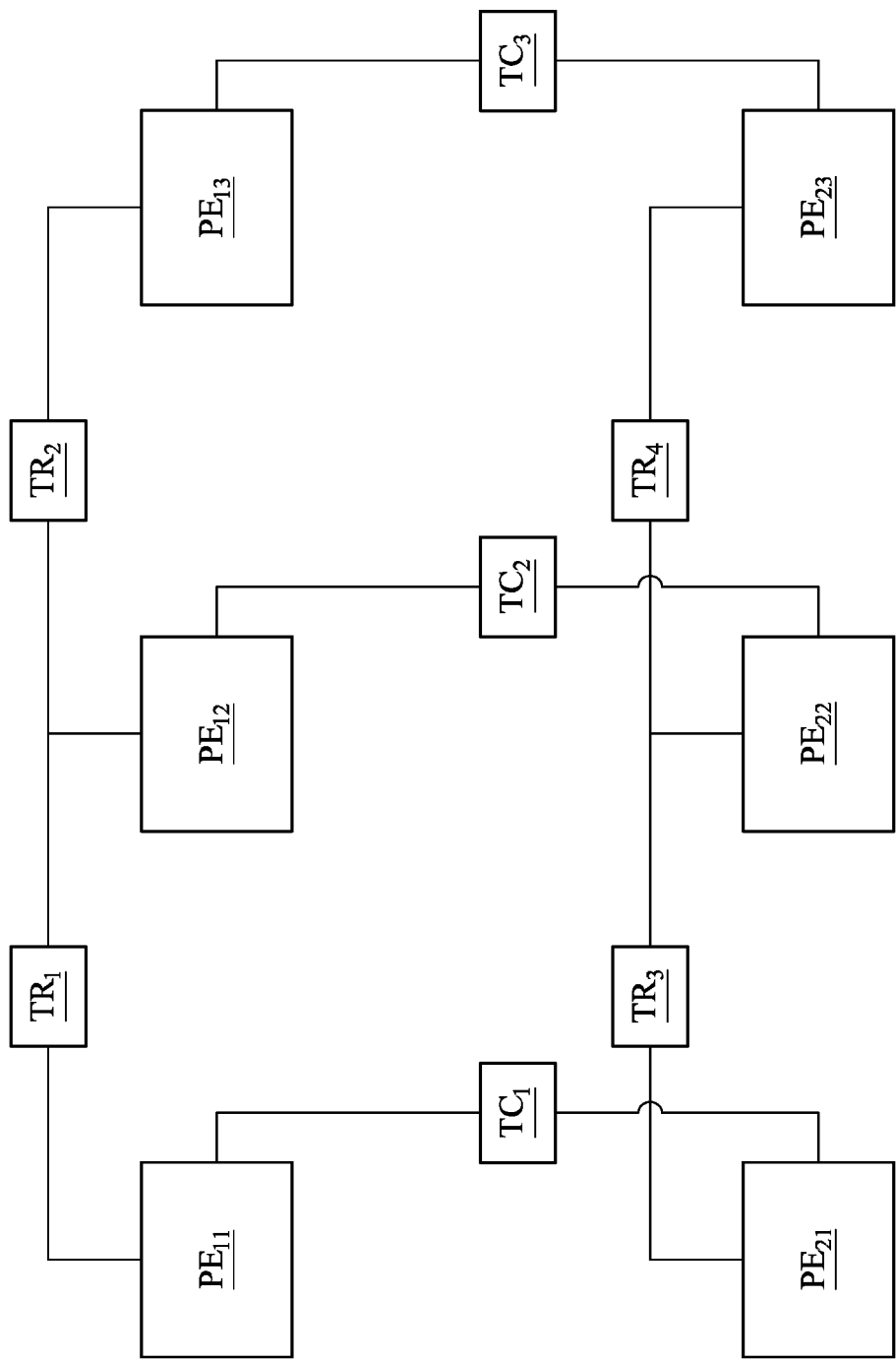
FIG. 8 is an architecture diagram of the processing element array according to a second embodiment of the present disclosure.

FIG. 8 is an architecture diagram of the processing element array according to a second embodiment of the present disclosure. The PE array includes M×N PEs arranged in M rows and N columns, (M×N–M) row transmission circuits, and (M×N-N) column transmission circuits, where both M and N are greater than or equal to 2. For the sake of brevity, in the example shown in FIGS. 8, M=2 and N=3, so the PEs includes $PE_{11}$ to $PE_{23}$, the row transmission circuits includes $TR_1$ to $TR_4$, and the column transmission circuit includes $TC_1$ to $TC_3$. In the second embodiment shown in FIG. 8, a certain column or a certain row extracted individually is equivalent to the first embodiment shown in FIG. 1. For example, the processing elements $PE_{11}$, $PE_{12}$, $PE_{13}$, the transmission circuits $TR_1$, $TR_2$ and the lines connected between these elements are equivalent to the first embodiment with N=3. For another example, the processing elements $PE_{11}$, $PE_{21}$, the transmission circuit $TC_1$ and the lines connected between these elements are equivalent to the first embodiment with N=2.

Figure 9:
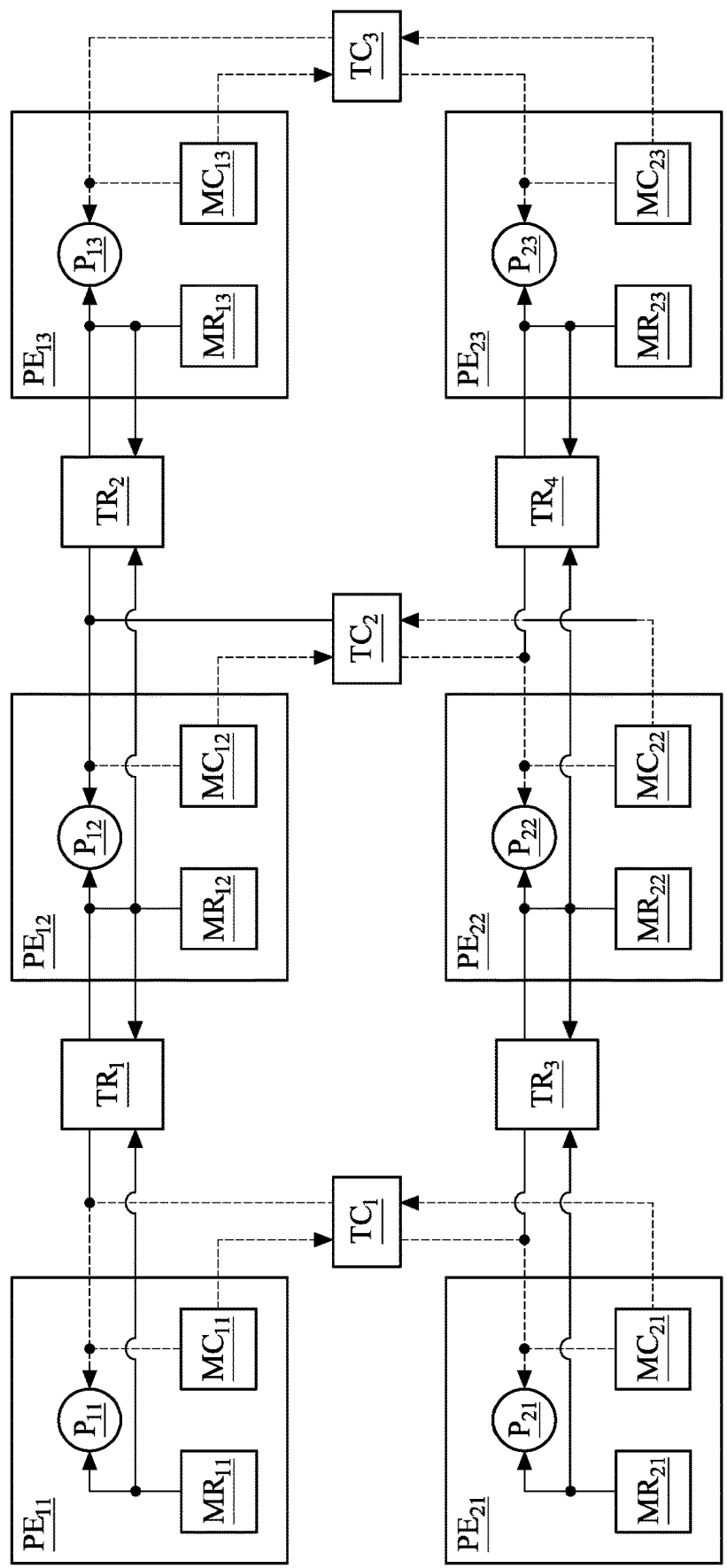
FIG. 9 is an internal architecture diagram of the second embodiment of the processing element array.

FIG. 9 is an internal architecture diagram of the second embodiment of the processing element array. For the sake of brevity, in the example shown in FIGS. 9, M=2 and N=3. Each PE has identical structure. Taking the processing element $PE_{11}$ as an example, $PE_{11}$ includes a processor $P_{11}$, a row memory $MR_{11}$ and a column memory $MC_{11}$. Therefore, each row has N row memories, and each column has M column memories.

The N row memories located in the same row (such as $MR_{11}$, $MR_{12}$ and $MR_{13}$) are configured to store P data, where the first row memory (such as $MR_{11}$) to the $N^{th}$ row memory (such as $MR_{13}$) are configured to store the first datum to the $N^{th}$ datum in the P data. When P is greater than N, the $N^{th}$ row memory (such as $MR_{13}$) is configured to store the $(N+1)^{th}$ datum in the P data. The allocation policy described above is identical to that of the first embodiment. It should be noted that when P is greater than N, the turnaround time can be reduced by using the allocation policy proposed in the present disclosure. However, the present disclosure does not particularly limit the values of P and N. The allocation policy proposed in the present disclosure is also applicable to the situation that P is equal to N or P is less than N. In addition, each of the N processors located in the same row performs operations according to the data stored in the corresponding row memory, or operates according to the data received from other PEs.

The M column memories located in the same column (such as $MC_{11}$ and $MC_{21}$) are configured to store Q data, where the first column memory (such as $MC_{11}$) to the $M^{th}$ column memory (such as $MC_{21}$) are configured to store the first datum to the $M^{th}$ datum in the Q data. When Q is greater than M, the $M^{th}$ column memory (such as $MC_{21}$) is configured to store the $(M+1)^{th}$ datum in the Q data. The allocation policy described above is identical to that of the first embodiment. It should be noted that when Q is greater than M, the turnaround time can be reduced by using the allocation policy proposed in the present disclosure. However, the present disclosure does not particularly limit the values of Q and M. The allocation policy proposed in the present disclosure is also applicable to the situation that Q is equal to M or Q is less than M. In addition, each of the M processors located in the same column performs operations according to the data stored in the corresponding column memory, or operates according to the data received from other PEs.

As shown in FIG. 9, regarding (M×N−M) row transmission circuits (such as $TR_1$, $TR_2$, $TR_3$, and $TR_4$), each of them is electrically connected to a left PE and a right PE adjacent to each other in the N PEs in each row. For example, $TR_1$ is electrically connected to $PE_{11}$ and $PE_{12}$, and $TR_2$ is electrically connected to $PE_{12}$ and $PE_{13}$. Each row transmission circuit is configured to receive a row data from the left PE and send the row data to the right PE, or receive another row data from the right PE and send said another row data to the left PE. Please refer to the direction of the arrow representing the input and output of the row transmission circuit in FIG. 9.

As shown in FIG. 9, regarding (M×N-N) column transmission circuits (such as $TC_1$, $TC_2$, and $TC_3$), each of them is electrically connected to an upper PE and a lower PE adjacent to each other in the M PEs in each column. For example, $TC_1$ is electrically connected to $PE_{11}$ and $PE_{21}$, and $TC_2$ is electrically connected to $PE_{12}$ and $PE_{22}$. Each column transmission circuit is configured to receive a column data from the upper PE and send the column data to the lower PE, or receive another column data from the lower PE and send said another column data to the upper PE. Please refer to the direction of the arrow representing the input and output of the column transmission circuit in FIG. 9.

It should be noted that the left and right PEs are named in respect to the positions of the row transmission circuits. The upper and lower PEs are named in respect to the positions of the column transmission circuits. For example, for the row transmission circuit $TR_1$, $PE_{11}$ is the left PE, and $PE_{12}$ is the right PE; for the column transmission circuit $TC_1$, $PE_{11}$ is an upper PE, and $PE_{21}$ is a lower PE.

In the second embodiment, the implementation of the row transmission circuits $TR_1$, $TR_2$, $TR_3$ and $TR_4$ and the column transmission circuits $TC_1$, $TC_2$ and $TC_3$ may refer to the transmission circuit $T_1$ in the first embodiment in FIG. 3, so the detail is not repeated here.

The PE array proposed by the second embodiment of the present disclosure is applicable to matrix operations. The following Equation 1 is an example of matrix multiplication, and the operations of the PE array according to the second embodiment of the present disclosure is described below with this example.

$$\begin{bmatrix} P & Q & R \\ S & T & U \end{bmatrix} = \begin{bmatrix} 1 & 2 & 3 & 4 \\ 5 & 6 & 7 & 8 \end{bmatrix} \begin{bmatrix} A & E & I \\ B & F & J \\ C & G & K \\ D & H & L \end{bmatrix} \quad \text{(Equation 1)}$$

In the matrix product of Equation 1, each element is calculated as shown in Equations 2 to 7 below:

$$P=1A+2B+3C+4D \quad \text{(Equation 2)}$$

$$Q=1E+2F+3G+4H \quad \text{(Equation 3)}$$

$$R=1I+2J+3K+4L \quad \text{(Equation 4)}$$

$$S=5A+6B+7C+8D \quad \text{(Equation 5)}$$

$$T=5E+6F+7G+8H \quad \text{(Equation 6)}$$

$$U=5I+6J+7K+8L \quad \text{(Equation 7)}$$

FIG. 10 to FIG. 13 are examples of the operating method of the processing element array according to the second embodiment of the present disclosure, where each figure represents an operating stage. The examples of FIG. 10 to FIG. 13 use the PE array shown in FIG. 8. For the sake of brevity, the row transmission circuits and the column transmission circuits are omitted. When viewing FIG. 10 to FIG. 13, the source, direction and destination of data transmission can be understood according to the directions of the arrows in the figures.

In FIG. 10 to FIG. 13, the processing element $PE_{11}$ calculates the element P according to the Equation 2, the processing element $PE_{12}$ calculates the element Q according to the Equation 3, the processing element $PE_{13}$ calculates the element R according to the Equation 4, the processing element $PE_{21}$ calculates the element S according to the Equation 5, the processing element $PE_{22}$ calculates the element T according to the Equation 6, and the processing element $PE_{23}$ calculates the element U according to the Equation 7.

$$\begin{bmatrix} 1 & 2 & 3 & 4 \\ 5 & 6 & 7 & 8 \end{bmatrix},$$

Figure 10:
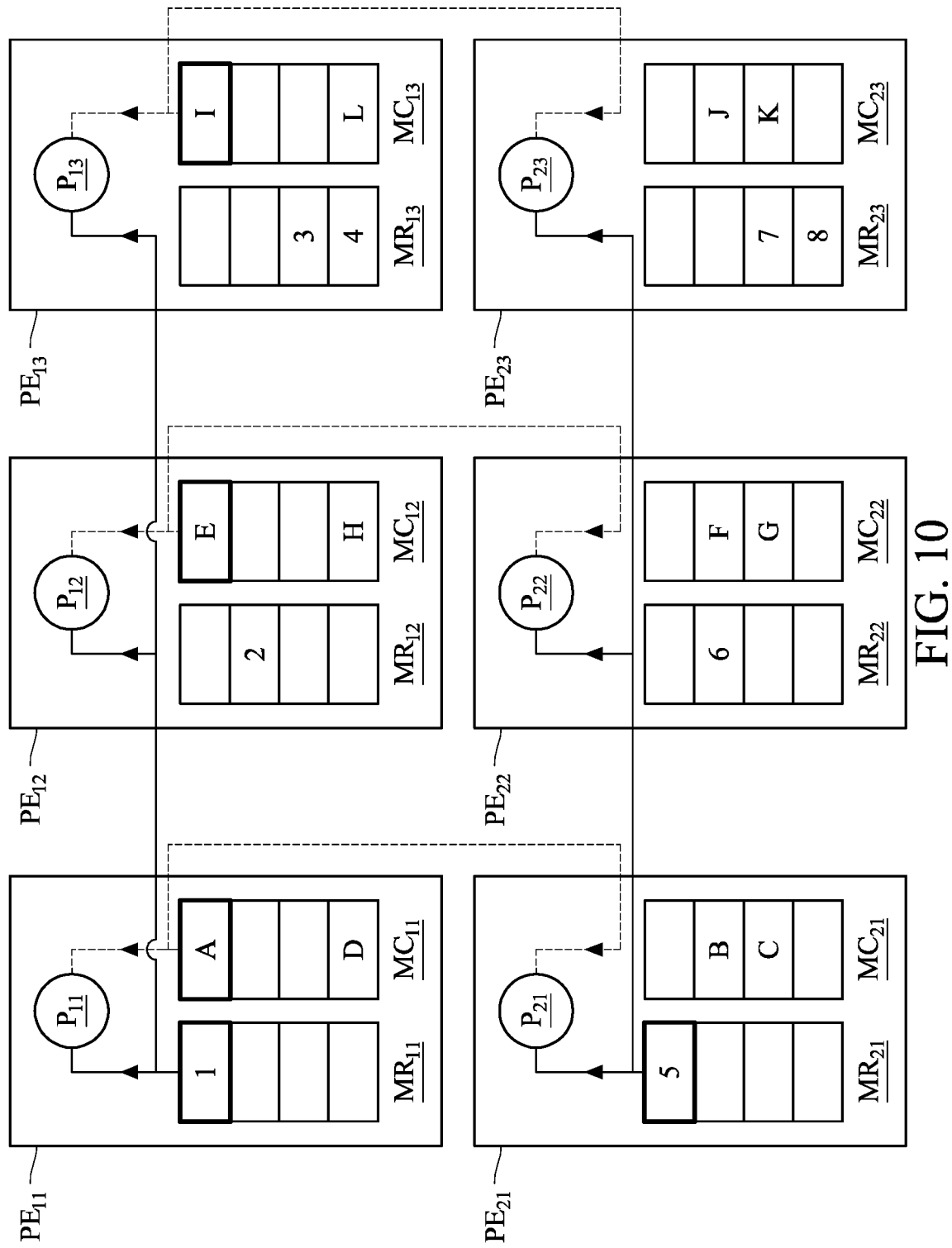
FIG. 10 to FIG. 13 are examples of the operating method of the processing element array according to the second embodiment of the present disclosure.

As shown in FIG. 10, regarding the matrix the four elements [1 2 3 4] of its first row are distributed and stored in the three row memories $MR_{11}$, $MR_{12}$ and $MR_{13}$ in the first row of the PE array, and the four elements [5 6 7 8] of its second row are distributed and stored in the three row memories $MR_{21}$, $MR_{22}$ and $MR_{23}$ in the second row of the PE array. According to the allocation policy proposed in the present disclosure, the element "3" and the element "4" are stored in the third row memory $MR_{13}$ in the first row, and the element "7" and the element "8" are stored in the third row memory $MR_{23}$ in the second row.

As shown in FIG. 10, regarding the matrix $$\begin{bmatrix} A & E & I \\ B & F & J \\ C & G & K \\ D & H & L \end{bmatrix},$$

the four elements $[A\ B\ C\ D]^T$ of its first column are distributed and stored in two column memories $MC_{11}$ and $MC_{21}$ in the first column of the PE array, the four elements $[E\ F\ G\ H]^T$ of its second column are distributed and stored in two column memories $MC_{12}$ and $MC_{22}$ in the third column of the PE array, and the four elements $[I\ J\ K\ L]^T$ of its third column are distributed and stored in two column memories $MC_{13}$ and $MC_{23}$ in the third column of the PE array. According to the allocation policy proposed in the present disclosure, the element "B" and the element "C" are stored in the second column memory $MC_{21}$ in the first column, and the element "D" is stored in the first column memory $MC_{11}$ in the first row. The storage method of multiple elements in the second or third row may be deducted by referring to the first row.

FIG. 10 shows the first stage of the operating method of the PE array according to the second embodiment of the present disclosure. At this time, the processor Pu may obtain "1A" according to its own row memory $MR_{11}$ and column memory $MC_{11}$. The Processing element $PE_{11}$ broadcasts the element "1" to processing elements $PE_{12}$ and $PE_{13}$ located in the same row. Therefore, the processing element $PE_{12}$ can obtain "1E" according to the element "1" received from the processing element $PE_{11}$ and its own column memory $MC_{12}$. The processing element $PE_{13}$ can obtain "1I" according to the element "1" received from the processing element $PE_{11}$ and its own column memory $MC_{13}$.

In FIG. 10, the processing element $PE_{11}$ further broadcasts the element "A" to the processing element $PE_{21}$ of the same column. In addition, the processing element $PE_{12}$ also broadcasts the element "E" to the processing element $PE_{22}$ of the same column, and the processing element $PE_{13}$ also broadcasts the element "I" to the processing element $PE_{23}$ of the same column.

Therefore, the processing element $PE_{21}$ can obtain "5A" according to its own row memory $MR_{21}$ and the element "A" received from the processing element $PE_{11}$. The processing element $PE_{21}$ then broadcasts the element "5" to the processing elements $PE_{22}$ and $PE_{23}$ of the same row. Therefore, the processing element $PE_{22}$ may obtain "5E" according to the element "5" received from the processing element $PE_{21}$ and the element "E" received from the processing element $PE_{12}$, and the processing element $PE_{23}$ can obtain "5I" according to the element "5" received from the processing element $PE_{21}$ and the element "I" received from the processing element $PE_{13}$. To sum up, in the first stage, the first terms in Equation 2 to Equation 7, including 1A, 1E, 1I, 5A, 5E and 5I, are respectively obtained by processors $P_{11}$, $P_{12}$, $P_{13}$, $P_{21}$, $P_{22}$ and $P_{23}$.

Figure 11:
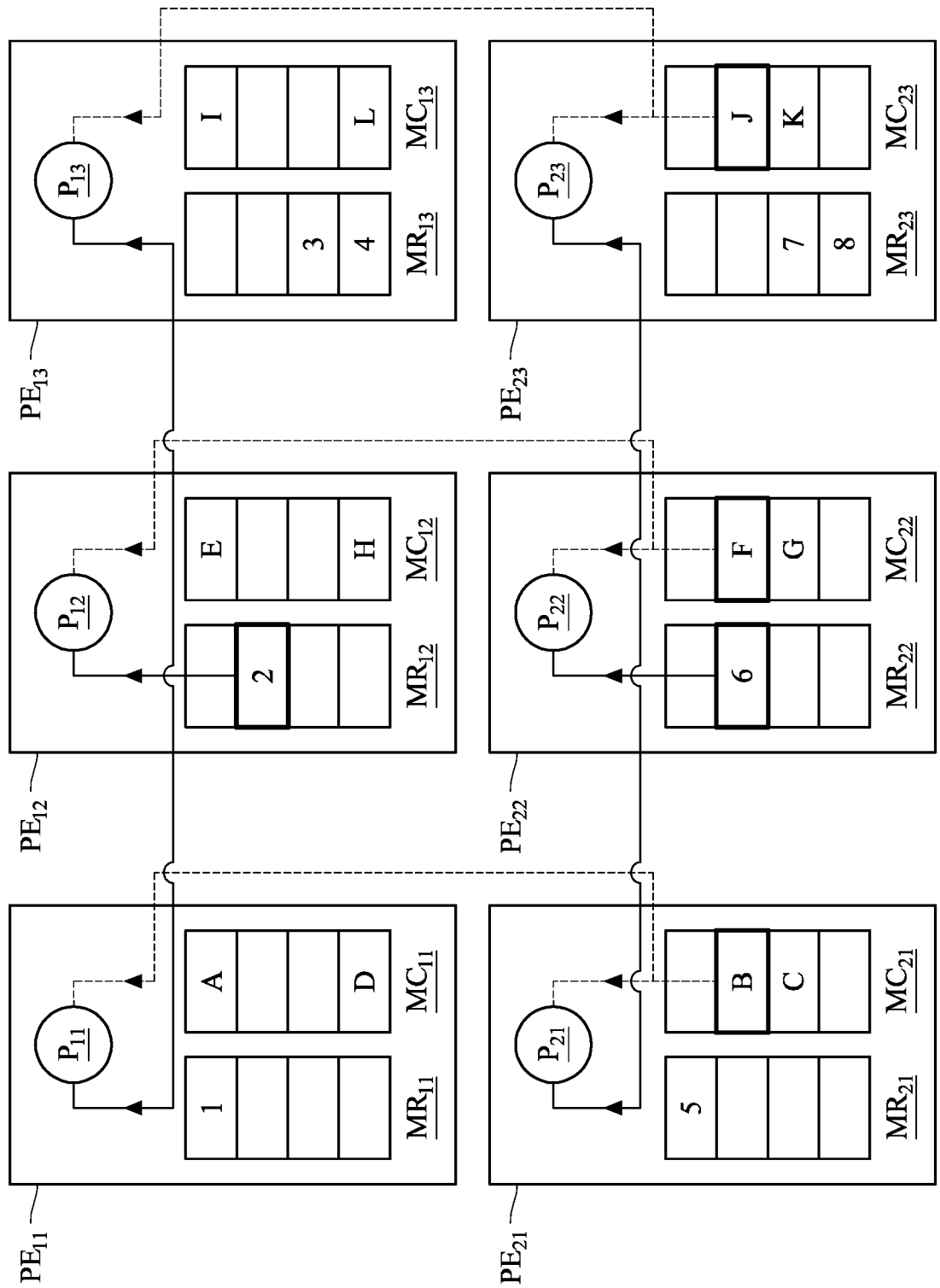

FIG. 11 shows the second stage of the operating method of the PE array according to the second embodiment of the present disclosure. At this time, the processor $P_{22}$ may obtain "6F" according to its own row memory $MR_{12}$ and column memory $MC_{22}$. The processing element $PE_{22}$ broadcasts the element "6" to processing elements $PE_{21}$ and $PE_{23}$ located in the same row. Therefore, the processing element $PE_{21}$ can obtain "6B" according to the element "6" received from the processing element $PE_{22}$ and its own column memory $MC_{21}$. The processing element $PE_{23}$ can obtain "6J" according to the element "6" received from the processing element $PE_{22}$ and its own column memory $MC_{23}$.

In FIG. 11, the processing element $PE_{22}$ further broadcasts the element "F" to the processing element $PE_{12}$ of the same column. In addition, the processing element $PE_{21}$ also broadcasts the element "B" to the processing element $PE_{11}$ of the same column, and the processing element $PE_{23}$ also broadcasts the element "J" to the processing element $PE_{13}$ of the same column.

Therefore, the processing element $PE_{12}$ can obtain "2F" according to its own row memory $MR_{12}$ and the element "F" received from the processing element $PE_{22}$. The processing element $PE_{12}$ then broadcasts the element "2" to the processing elements $PE_{12}$ and $PE_{13}$ of the same row. Therefore, the processing element $PE_{11}$ may obtain "2B" according to the element "2" received from the processing element $PE_{12}$ and the element "B" received from the processing element $PE_{21}$, and the processing element $PE_{13}$ can obtain "2J" according to the element "2" received from the processing element $PE_{12}$ and the element "J" received from the processing element $PE_{23}$. To sum up, in the second stage, the second terms in Equation 2 to Equation 7, including 2B, 2F, 2J, 6B, 6F and 6J, are respectively obtained by processors $P_{11}$, $P_{12}$, $P_{13}$, $P_{21}$, $P_{22}$ and $P_{23}$.

Figure 12:
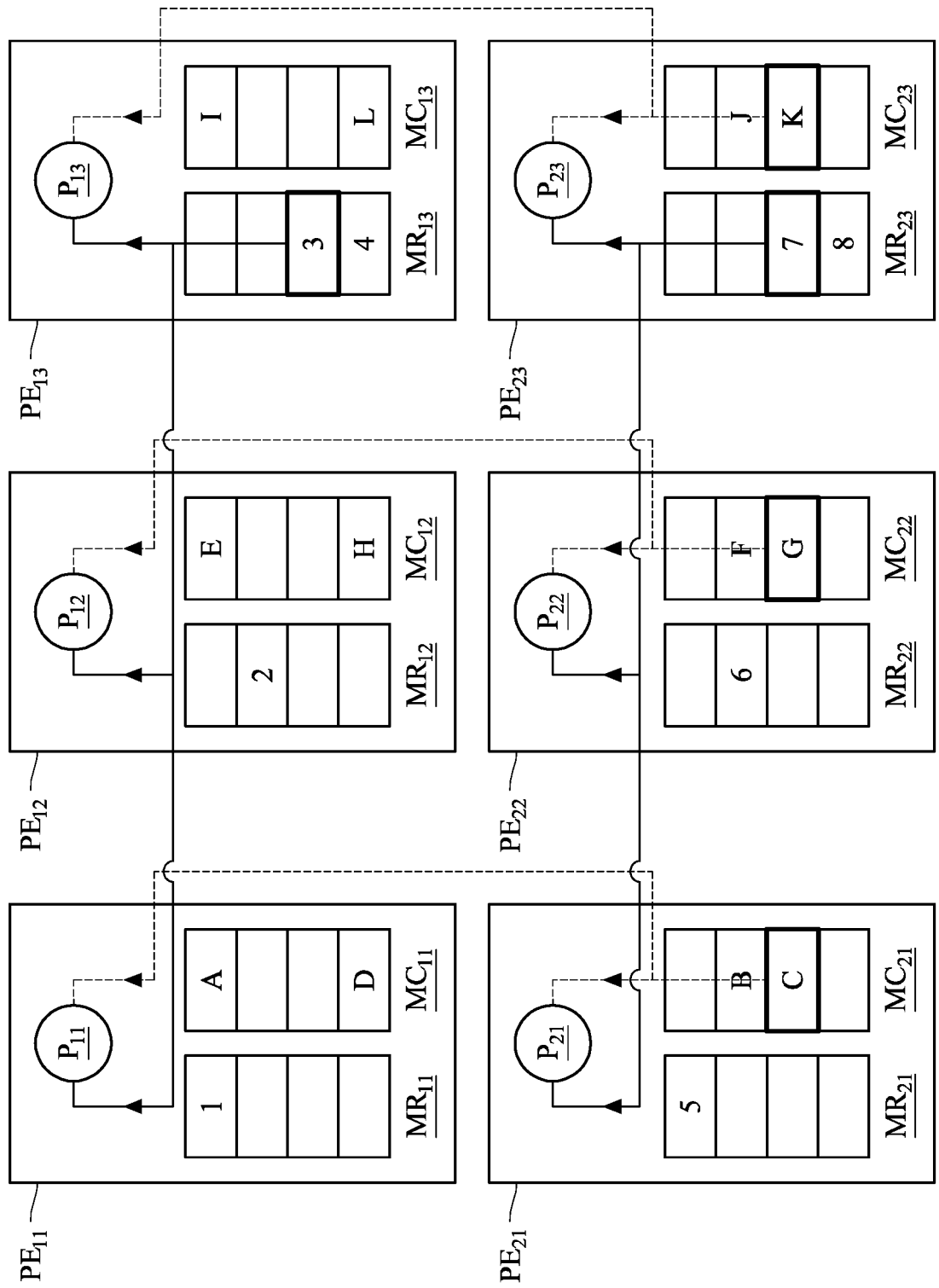

FIG. 12 shows the third stage of the operating method of the PE array according to the second embodiment of the present disclosure. At this time, the processor $P_{23}$ may obtain "7K" according to its own row memory $MR_{23}$ and column memory $MC_{23}$. The Processing element $PE_{23}$ broadcasts the element "7" to processing elements $PE_{21}$ and $PE_{22}$ located in the same row. Therefore, the processing element $PE_{21}$ can obtain "7C" according to the element "7" received from the processing element $PE_{23}$ and its own column memory $MC_{21}$. The processing element $PE_{22}$ can obtain "7G" according to the element "7" received from the processing element $PE_{23}$ and its own column memory $MC_{22}$.

In FIG. 12, the processing element $PE_{23}$ further broadcasts the element "K" to the processing element $PE_{13}$ of the same column. In addition, the processing element $PE_{22}$ also broadcasts the element "G" to the processing element $PE_{11}$ of the same column, and the processing element $PE_{21}$ also broadcasts the element "C" to the processing element $PE_{12}$ of the same column.

Therefore, the processing element $PE_{13}$ can obtain "3K" according to its own row memory $MR_{13}$ and the element "K" received from the processing element $PE_{22}$. The processing element $PE_{13}$ then broadcasts the element "3" to the processing elements $PE_{11}$ and $PE_{12}$ of the same row. Therefore, the processing element $PE_{11}$ may obtain "3C" according to the element "3" received from the processing element $PE_{13}$ and the element "C" received from the processing element $PE_{21}$, and the processing element $PE_{12}$ can obtain "3G" according to the element "3" received from the processing element $PE_{13}$ and the element "G" received from the processing element $PE_{22}$. To sum up, in the third stage, the third terms in Equation 2 to Equation 7, including 3C, 3G, 3K, 7C, 7G and 7K, are respectively obtained by processors $P_{11}$, $P_{12}$, $P_{13}$, $P_{21}$, $P_{22}$ and $P_{23}$.

Figure 13:
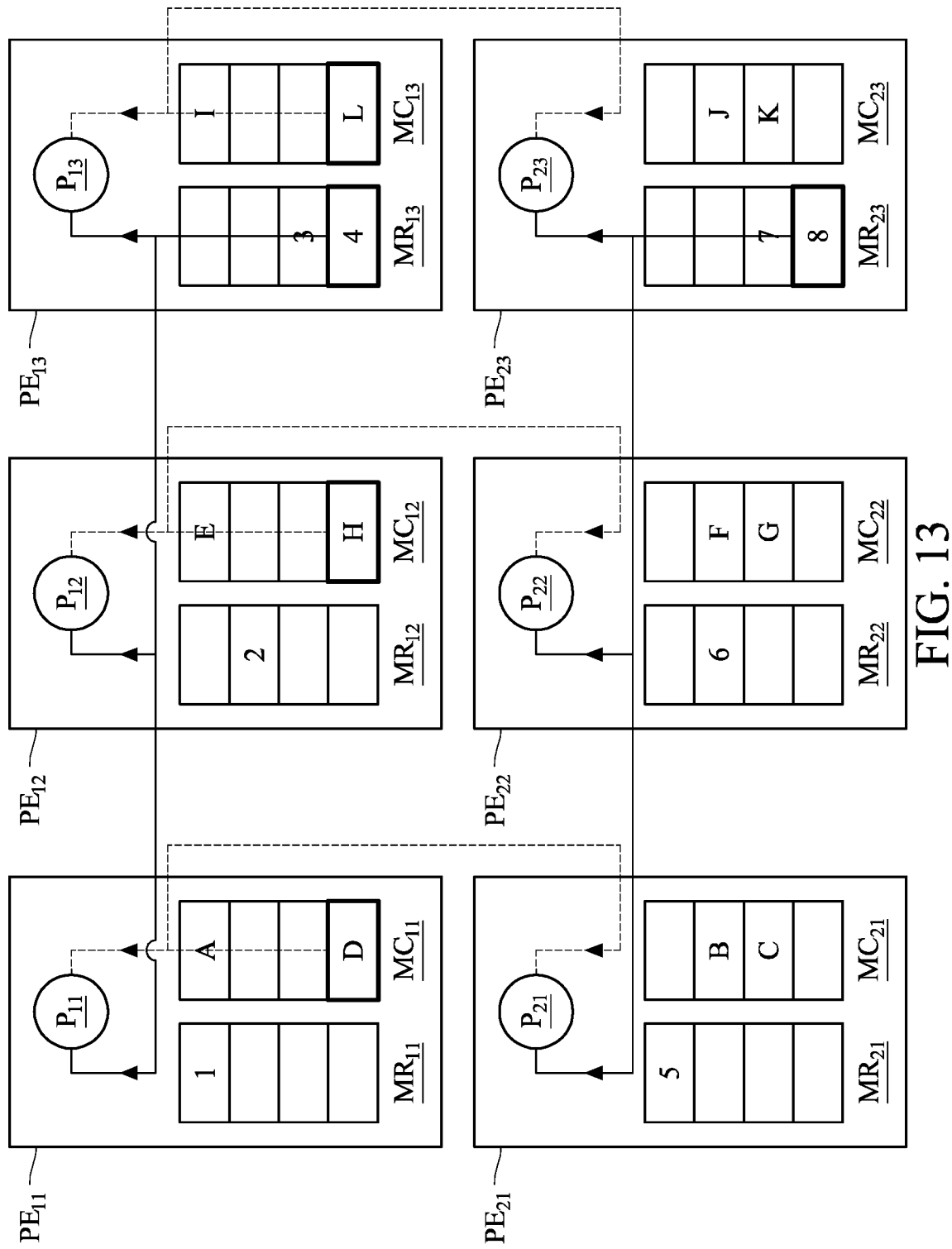

FIG. 13 shows the fourth stage of the operating method of the PE array according to the second embodiment of the present disclosure. At this time, the processor $P_{13}$ may obtain "4L" according to its own row memory $MR_{13}$ and column memory $MC_{13}$. The Processing element $PE_{13}$ broadcasts the element "4" to processing elements $PE_{11}$ and $PE_{12}$ located in the same row. Therefore, the processing element $PE_{11}$ can obtain "4D" according to the element "4" received from the processing element $PE_{13}$ and its own column memory $MC_{11}$. The processing element $PE_{12}$ can obtain "4H" according to the element "4" received from the processing element $PE_{13}$ and its own column memory $MC_{12}$.

In FIG. 13, the processing element $PE_{11}$ broadcasts the element "L" to the processing element $PE_{23}$ of the same column. In addition, the processing element $PE_{11}$ also broadcasts the element "D" to the processing element $PE_{21}$ of the same column, and the processing element $PE_{12}$ also broadcasts the element "H" to the processing element $PE_{22}$ of the same column.

Therefore, the processing element $PE_{23}$ can obtain "8L" according to its own row memory $MR_{23}$ and the element "L" received from the processing element $PE_{11}$. The processing element $PE_{23}$ then broadcasts the element "8" to the processing elements $PE_{21}$ and $PE_{22}$ of the same row. Therefore, the processing element $PE_{21}$ may obtain "8D" according to the element "8" received from the processing element $PE_{23}$ and the element "D" received from the processing element $PE_{11}$, and the processing element $PE_{22}$ can obtain "8H" according to the element "8" received from the processing element $PE_{23}$ and the element "H" received from the processing element $PE_{12}$. To sum up, in the fourth stage, the fourth terms in Equation 2 to Equation 7, including 4D, 4H, 4L, 8D, 8H and 8L, are respectively obtained by processors $P_{11}$, $P_{12}$, $P_{13}$, $P_{21}$, $P_{22}$ and $P_{23}$.

As shown in FIG. 8 to FIG. 13, the PE array and the operating method thereof according to the second embodiment of the present disclosure implement operations of the matrix multiplication, which corresponds to the data dimension "2". It should be noted that the structure of a certain row or a certain column in FIG. 8 and FIG. 9 corresponds to the PE array of the first embodiment of the present disclosure. The operating method of a certain row or a certain column in FIG. 10 to FIG. 13 corresponds to the operating method of the PE array according to the first embodiment of the present disclosure. In other words, although the data dimension corresponding to the first embodiment of the present disclosure is 1, after referring to the first and second embodiments of the present disclosure, the PE array and its operating method may be easily extended to a higher data dimension. When the data dimension is higher, the number of processing elements is larger, so that the present disclosure may save more turnaround time, and thus greatly improving the performance of the PE array.

What is claimed is:

1. An operation method of a processing element (PE) array, wherein the PE array comprises a plurality of PEs arranged linearly, a number of the plurality of PEs is N, N is greater than or equal to 3, and the operation method of the PE array comprises:
performing, by the plurality of PEs, a first data transmission procedure, wherein an initial value of I is one, and the first data transmission procedure comprises:
performing, by an $I^{th}$ PE of the plurality of PEs, a calculation according to a first datum stored in itself;
sending, by the $I^{th}$ PE, the first datum to the plurality of PEs except the $I^{th}$ PE;
performing, by the plurality of PEs except the $I^{th}$ PE, the calculation according to the first datum;
when I is less than N, a value of I is changed to previous I incremented by one and performing the first data transmission procedure again by the plurality of PEs;
when I is equal to N, performing a second data transmission procedure by the plurality of PEs, wherein an initial value of J is N, and the second data transmission procedure comprises:
performing, by a $J^{th}$ PE of the plurality of PEs, the calculation according to a second datum stored in itself;
sending, by the $J^{th}$ PE, the second datum to the plurality of PEs except the $J^{th}$ PE;
calculating, by the plurality of PEs except the $J^{th}$ PE, according to the second datum; and
when J is greater than one and a $(J-1)^{th}$ PE stores the second datum, a value of J is changed to previous J decremented by one and performing the second data transmission procedure again by the plurality of PEs,
before performing the first data transmission procedure, further comprising:
storing a first portion of a set of data in a first order by the plurality of PEs; and
storing a second portion of the set of data in a second order by one or more of the plurality of PEs; wherein the first order is incremented from 1 to N, the second order is opposite to the first order, the first portion includes the first datum of each of the plurality of PEs, and the second portion includes the second datum of each of the one or more of the plurality of PEs.

2. The operation method of the PE array of claim 1, wherein the plurality of PEs stores a first portion of a set of data in a first order, one or more of the plurality of PEs stores a second portion of the set of data in a second order, the first order is incremented from one to N, the second order is opposite to the first order, the first portion includes the first datum of each of the plurality of PEs, and the second portion includes the second datum of each of the one or more of the plurality of PEs.

3. The operation method of the PE array of claim 1 further comprising:
when J is equal to one and the $J^{th}$ PE stores the first datum which is unused, performing the first data transmission procedure again by the plurality of PEs.

4. The operation method of the PE array of claim 1, wherein sending, by the $I^{th}$ PE, the first datum to the plurality of PEs except the $I^{th}$ PE comprises:
performing a broadcast procedure, wherein initial values of E and F are 0 and the broadcast procedure comprises:
sending, by an $(I+E)^{th}$ PE of the plurality of PEs, the first datum to an $(I+E+1)^{th}$ PE of the plurality of PEs;
sending, by an $(I-F)^{th}$ PE of the plurality of PEs, the first datum to an $(I-F-1)^{th}$ PE of the plurality of PEs; and
a value of E is changed to previous E incremented by one when (I+E) is less than N, a value of F is changed to previous F decremented by one when (I-F) is greater than one, and performing the broadcast procedure again by the plurality of PEs.

5. A processing element (PE) array comprising:
a plurality of PEs arranged linearly, wherein a number of the plurality of PEs is N and N is greater than or equal to 3, each of the plurality of PEs comprises a processor and a memory such that the plurality of PEs comprises N processors and N memories, wherein:
the N memories are configured to store P data, and P is greater than N;
a first memory to a $N^{th}$ memory of the N memories are respectively configured to store a first datum to a $N^{th}$ datum of the P data;
the $N^{th}$ memory of the N memories is further configured to store a $(N+1)^{th}$ datum of the P data;
each of the N processors calculates according to one of the P data stored in one of the N memories corresponding to itself, or calculates according to another one of the P data received from other PE; and
(N+1) transmission circuits, wherein each of the (N+1) transmission circuits is electrically connected to a left PE and a right PE adjacent to each other in the N PEs, each of the (N+1) transmission circuits is configured to receive information from the left PE and sends the information to the right PE, or receive another information from the right PE and sends said another information to the left PE.

6. The PE array of claim 5, wherein the left PE comprises a left input line and a left output line, the right PE comprises a right input line and a right output line, and each of the transmission circuits comprises:
a collector electrically connected to the left input line and the right input line and configured to collect a datum of one of the left input line and the right input line;
a detector electrically connected to the left input line and the right input line and configured to generate a left label when the left input line has the datum and generate a right label when the right input line has the datum;
a queue electrically connected to the collector and the detector, wherein the queue comprises a plurality of data rows, each of the plurality of data rows comprises a data field and a source label field, the data field is configured to store the datum of one of the left input line and the right input line, and the source label field is configured to store one of the left label and the right label; and an output selector electrically connected to the left output line, the right output line and the queue, wherein the output selector is configured to read one of the plurality of data rows to output the datum; the output selector outputs the datum through the left output line when the source label field stores the left label, and the output selector outputs the datum through the right output line when the source label field stores the right label.

7. A processing element (PE) array comprising:

M×N PEs arranged in M rows and N columns, wherein both M and N are greater than or equal to 2, each of the M×N PEs comprises a processor, a row memory, and a column memory such that the M×N PEs comprise M×N processors, each of the M rows has N row memories, and each of the N columns has M column memories, wherein:

the N row memories located in the same row are configured to store P data and P is greater than N;

a first row memory to a $N^{th}$ row memory in the N row memories located in the same row are respectively configured to store a first datum to a $N^{th}$ datum in the P data;

the $N^{th}$ row memory in the N row memories located in the same row is configured to store a $(N+1)^{th}$ datum in the P data;

each of N processors in the same row calculates according to a datum stored in the row memory corresponding to itself, or calculates according to another datum received from other PEs;

the M column memories located in the same column are configured to store Q data and Q is greater than M;

a first column memory to a $M^{th}$ column memory in the M column memories located in the same column are respectively configured to store a first datum to a $M^{th}$ datum in the Q data;

the $M^{th}$ column memory in the N column memories located in the same column is configured to store a $(M+1)^{th}$ datum in the Q data;

each of M processors in the same column calculates according to a datum stored in the column memory corresponding to itself, or calculates according to another datum received from other PEs;

(M×N−M) row transmission circuits, wherein:

each of the (M×N−M) row transmission circuits is electrically connected to a left PE and a right PE adjacent to each other in the N PEs in each of the M rows; and each of the (M×N−M) row transmission circuits is configured to receive a row data from the left PE and send the row data to the right PE, or receive another row data from the right PE and send said another row data to the left PE; and (M×N−N) column transmission circuits, wherein:

each of the (M×N−N) column transmission circuits is electrically connected to an upper PE and a lower PE adjacent to each other in the M PEs in each of the N columns; and each of the (M×N−N) column transmission circuits is configured to receive a column data from the upper PE and send the column data to the lower PE, or receive another column data from the lower PE and send said another column data to the upper PE.

8. The PE array of claim 7, wherein the left PE comprises a left input line and a left output line, the right PE comprises a right input line and a right output line, and each of the row transmission circuit comprises:

a collector electrically connected to the left input line and the right input line and configured to collect a datum of one of the left input line and the right input line;

a detector electrically connected to the left input line and the right input line and configured to generate a left label when the left input line has the datum and generate a right label when the right input line has the datum;

a queue electrically connected to the collector and the detector, wherein the queue comprises a plurality of data rows, each of the plurality of data rows comprises a data field and a source label field, the data field is configured to store the datum of one of the left input line and the right input line, and the source label field is configured to store one of the left label and the right label; and an output selector electrically connected to the left output line, the right output line and the queue, wherein the output selector is configured to read one of the plurality of data rows to output the datum; the output selector outputs the datum through the left output line when the source label field stores the left label, and the output selector outputs the datum through the right output line when the source label field stores the right label.

9. The PE array of claim 7, wherein the upper PE comprises an upper input line and an upper output line, the lower PE comprises a lower input line and a lower output line, and each of the row transmission circuit comprises:

a collector electrically connected to the upper input line and the lower input line and configured to collect a datum of one of the upper input line and the lower input line;

a detector electrically connected to the upper input line and the lower input line and configured to generate an upper label when the upper input line has the datum and generate a lower label when the lower input line has the datum;

a queue electrically connected to the collector and the detector, wherein the queue comprises a plurality of data rows, each of the plurality of data rows comprises a data field and a source label field, the data field is configured to store the datum of one of the upper input line and the lower input line, and the source label field is configured to store one of the upper label and the lower label; and an output selector electrically connected to the upper output line, the lower output line and the queue, wherein the output selector is configured to read one of the plurality of data rows to output the datum; the output selector outputs the datum through the upper output line when the source label field stores the upper label, and the output selector outputs the datum through the lower output line when the source label field stores the lower label.

* * * * *